United States Patent
Davis et al.

(10) Patent No.: US 10,719,554 B1
(45) Date of Patent: Jul. 21, 2020

(54) SELECTIVE MAINTENANCE OF A SPATIAL INDEX

(71) Applicant: Amazon Technologies, Inc., Seattle, WA (US)

(72) Inventors: Jeffrey Davis, Santa Clara, CA (US); Anurag Windlass Gupta, Atherton, CA (US); Sailesh Krishnamurthy, Palo Alto, CA (US); Stefano Stefani, Issaquah, WA (US); Uttam Jain, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 338 days.

(21) Appl. No.: 15/269,934

(22) Filed: Sep. 19, 2016

(51) Int. Cl.
| | |
|---|---|
| *G06F 16/901* | (2019.01) |
| *G06F 16/903* | (2019.01) |
| *G06F 16/23* | (2019.01) |
| *G06F 16/9537* | (2019.01) |

(52) U.S. Cl.
CPC ........ *G06F 16/901* (2019.01); *G06F 16/2365* (2019.01); *G06F 16/903* (2019.01); *G06F 16/9537* (2019.01)

(58) Field of Classification Search
CPC ......... G06F 17/30592; G06F 17/30327; G06F 17/30333; G06F 16/283; G06F 16/2246; G06F 16/2264; G06F 16/901
USPC .......................................................... 707/696
See application file for complete search history.

(56) References Cited

U.S. PATENT DOCUMENTS

| | | | |
|---|---|---|---|
| 6,381,605 B1* | 4/2002 | Kothuri | G06F 16/2264 707/802 |
| 6,505,205 B1* | 1/2003 | Kothuri | G06F 16/2264 707/804 |
| 7,877,405 B2 | 1/2011 | Kothuri et al. | |
| 7,945,569 B2 | 5/2011 | Drory et al. | |
| 8,244,743 B2 | 8/2012 | Gonzalez et al. | |
| 8,892,569 B2* | 11/2014 | Bowman | G06F 17/30327 707/743 |
| 8,949,224 B2 | 2/2015 | Gupta | |
| 9,430,494 B2* | 8/2016 | Park | G06F 16/24568 707/743 |

(Continued)

OTHER PUBLICATIONS

Michael Connor, et al., "Fast construction of k-Nearest Neighbor Graphs for Point Clouds", IEEE Transaction on Visualization and Computer Graphice, Sep. 2009, pp. 1-11.

(Continued)

*Primary Examiner* — Shahid A Alam
(74) *Attorney, Agent, or Firm* — Robert C. Kowert; Kowert, Hood, Munion, Rankin & Goetzel, P.C.

(57) ABSTRACT

A storage engine may selectively maintain a spatial index for accessing spatial data. A spatial query may be received and the portions of the spatial index to evaluate may be determined by replacing those portions associated with regions identified for the query that do not exist in the spatial index with portions that do exist in the spatial index and are associated with a region that includes the identified regions. When inserting spatial objects into the spatial index, a determination may be made whether to create a new portion in the index if none currently exist that match a spatial index value for a new spatial object or to modify the spatial index value of the spatial object to insert the spatial object into an existing portion of the spatial index.

20 Claims, 9 Drawing Sheets

(56) References Cited

U.S. PATENT DOCUMENTS

| | | | |
|---|---|---|---|
| 2004/0034666 A1* | 2/2004 | Chen | G06F 16/29 |
| | | | 707/999.107 |
| 2005/0222978 A1* | 10/2005 | Drory | G06F 16/29 |
| 2008/0201302 A1 | 8/2008 | Kimchi et al. | |
| 2008/0208820 A1* | 8/2008 | Usey | G06F 16/313 |
| | | | 707/999.003 |
| 2010/0114905 A1* | 5/2010 | Slavik | G06F 16/29 |
| | | | 707/743 |
| 2012/0136874 A1* | 5/2012 | Milby | G06F 16/2477 |
| | | | 707/743 |
| 2012/0166446 A1* | 6/2012 | Bowman | G06F 17/30241 |
| | | | 707/743 |
| 2013/0016109 A1* | 1/2013 | Garanzha | G06T 15/06 |
| | | | 345/501 |
| 2016/0041778 A1* | 2/2016 | Li | G06F 3/061 |
| | | | 711/114 |

OTHER PUBLICATIONS

Christian Bohm, et al., "XZ-Ordering: A Space-Filling Curve for Objects with Spatial Extension", 6th International Symposium on Large Spatial Databases (SSD), 1999, pp. 1-16.
U.S. Appl. No. 115/192,945, filed Jun. 24, 2016, Mehul Shah et al.

* cited by examiner

SELECTIVE MAINTENANCE OF A SPATIAL INDEX

BACKGROUND

Data storage systems implement indexing structures to provide fast access operations. For example, in order to service a read request, an index structure that is maintained for data in a data store may be accessed in order to determine the location of requested data and service the read request. Index structures may be optimized for locating different types or combinations of data. Some index structures, for example, may be optimized for searching for unique or near-unique values (e.g., table primary keys). Some index structures may be optimized for storing a particular type of data. A spatial index, for instance, may be maintained to provide access to spatial data, data representing n-dimensional points, shapes, or objects. Different techniques may be implemented to further optimize specialized index structures, like a spatial data index, so that querying for certain spatial data may be quickly and efficiently performed.

Figure 1:
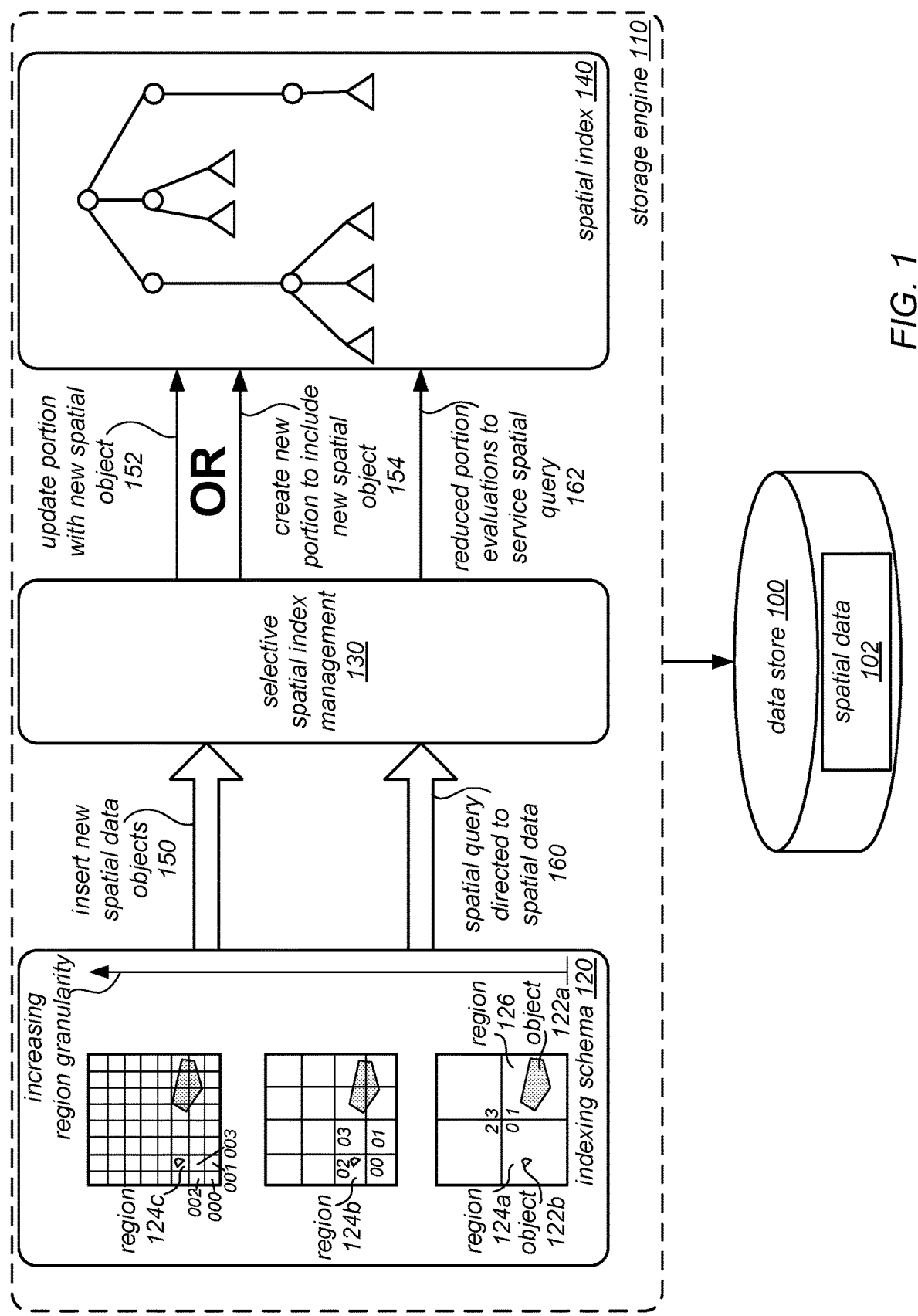
FIG. 1 is a logical diagram that illustrates selective maintenance of a spatial index, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 (f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of selective maintenance of a spatial index are described herein. Data stores may utilize indexing structures to provide efficient access to data stored in the data store. For spatial data, data representing points, locations, shapes, figures, lines or other geographic information, a spatial index may provide an efficient way to access spatial data stored in a data store. For example, spatial queries may be submitted and evaluated with respect to the spatial data store to retrieve spatial objects (and any other data related to the spatial object, such as other column values in the same row of the identified spatial object). In this way, the connection between other data maintained in the data store in addition to the spatial data (e.g., time, identity, what happened) may be evaluated with respect to spatial data. For instance, a database that tracks music purchases, recording the time, date, identity, and location coordinates, could be queried to determine if the purchase request occurred during a concert at a concert venue for a band that produced the purchased music by submitting a spatial query for purchases that occurred within a location, the concert venue, time, and product purchase (e.g., songs or albums released by the band).

Because spatial indexes can cover wide geographic areas and diverse numbers and/or types of spatial objects, search performance and efficiency may need to be balanced with maintaining different granularities of spatial information. FIG. 1 is a logical diagram that illustrates selective maintenance of a spatial index, according to some embodiments. Storage engine 110 may be any type of database (e.g., relational or non-relation) or other storage engine configured to process queries for data stored in a data store, such as data store 100. Storage engine 110 may be implemented together with data store 100 separately (e.g., via network connection from a computing device implementing storage engine 110 and a remote storage server implementing data store 100, or together (e.g., as part of the same computing device, where data store 100 is attached, local storage). Spatial data 102 may be maintained in data store 100 and made available via storage engine 110 for query access or to add, update, or remove some or all of spatial data 102.

Storage engine 110 may, in various embodiments, implement an indexing schema 120 to manage a spatial index 140 for accessing spatial data 102. For example, indexing schema 120 may map n-dimensional spatial data into a single dimension, via a space filling curve, such as a Z-order curve or a Hilbert curve. For example, a spatial area that includes all of the spatial data to be stored in spatial data 102 may be decomposed into different regions (e.g., 4 quadrants). Each of these quadrants may be assigned a quadrant identifier. In order to map a spatial object, the smallest region that wholly includes the object may be identified. Thus, a recursive technique may be implemented where the original regions are subdivided (e.g., each quadrant subdivided into quadrants) until a region is reached where the object is not wholly included in the region. The prior region with coarser granularity that did wholly include the object is identified as the smallest region that wholly includes the object. For example, object 122a is wholly included in region 126, but no other region, and therefore region 126 represents the smallest region that wholly includes object 122a. In another example, object 122b is included in regions 124a, 124b, and 124c and therefore the smallest region that wholly includes object 122b is region 124c (assuming that a finer granularity division would not wholly include object 122b). Indexing schema 120 takes the sequence of regions that contain a spatial object and generates a value that is used to insert the spatial object (or an identifier or representation of the spatial object) in spatial index 140. For example, if the regions are numbered as depicted in FIG. 1, then indexing schema 120 would use region number 1 for object 122a and region number 021 for object 122b. These region numbers may be referred to as quadrant sequences for those indexing schemas that subdivide into quadrants. The granularity of a quadrant sequence can be determined by its length—the longer the number, the greater the granularity. Selecting regions (and thus determining the region number may be done in different ways. XZ ordering, which may be implemented in some embodiments, defines overlapping regions, so that smaller objects that are located on or just over boundaries between less granular quadrants may be wholly included in an overlapping region that has higher granularity (and thus better selectivity when evaluating spatial queries).

The region numbers determined according to indexing scheme 120 may be used to build an indexing structure for spatial index 140. For example, in various embodiments spatial index 140 may be implemented as a balanced tree or other order-preserving, one dimensional structure. Different leaf nodes of a b tree, for instance, may correspond to different regions (e.g., different region numbers).

Storage engine 110 may also implement selective spatial index management 130, in some embodiments. Selective spatial index management 130 may control the shape or number of portions maintained in spatial index 140 that correspond to the different regions. For example, when a request to insert new spatial data objects is received 150, as discussed below with regard to FIG. 8, selective management may determine whether to create a new portion to include the spatial object 154 (e.g., a new leaf node) or update a currently maintained portion with the new spatial object. In this way, selective spatial index management can optimize the spatial index based on performance vs costs to maintain the index structure with less depth, as discussed below with regard to FIG. 8.

Selective spatial index management 130 may also handle spatial queries directed to the spatial data 160 so that selections to subsume spatial objects within an portion of an index (instead of creating a new index portion) do not result in attempts to evaluate or probe portions of spatial index 140 that do not exist (e.g., a check for a leaf node that does not exist). Instead, alternative regions with corresponding portions that do exist can be substituted in for regions initially identified for a query if those regions do not have a corresponding portion in index 140. Spatial index management 130 may also implement other optimizations, such accounting for object representation that distorts the spatial index values generated according to the spatial indexing scheme (e.g., by modifying the representation of coordinates in floating point format) to ensure that spatial data is represented in optimal forms for insertion into spatial index 140. Similarly, data skew that occurs as a result of similarly located spatial objects may be accounted for by applying histograms that counter the data skew when inserting or query spatial objects in spatial index 140, as discussed below with regard to FIG. 8.

Please note, FIG. 1 is provided as a logical illustration of selective maintenance of a spatial index, and is not intended to be limiting as to the indexing schema, spatial index, storage engine or data store 100.

The specification first describes an example of a database service that may implement selective maintenance of a spatial index for spatial data hosted by the database service, according to various embodiments. The example database service may host spatial data for many different types of clients, in various embodiments. Included in the description of the example network-based database service are various aspects of the example network-based database service along with the various interactions between the database service and a separate distributed storage service which may store the spatial data. The specification then describes a flowchart of various embodiments of methods for selective maintenance of a spatial index. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). Log sequence numbers may be assigned to the redo log records from a log sequence number space. In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the storage layer may also assume the responsibility for the replication of data stored on behalf of clients (and/or metadata associated with that data, such as redo log records) across multiple storage nodes.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier may support the use of synchronous or to asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

Figure 2:
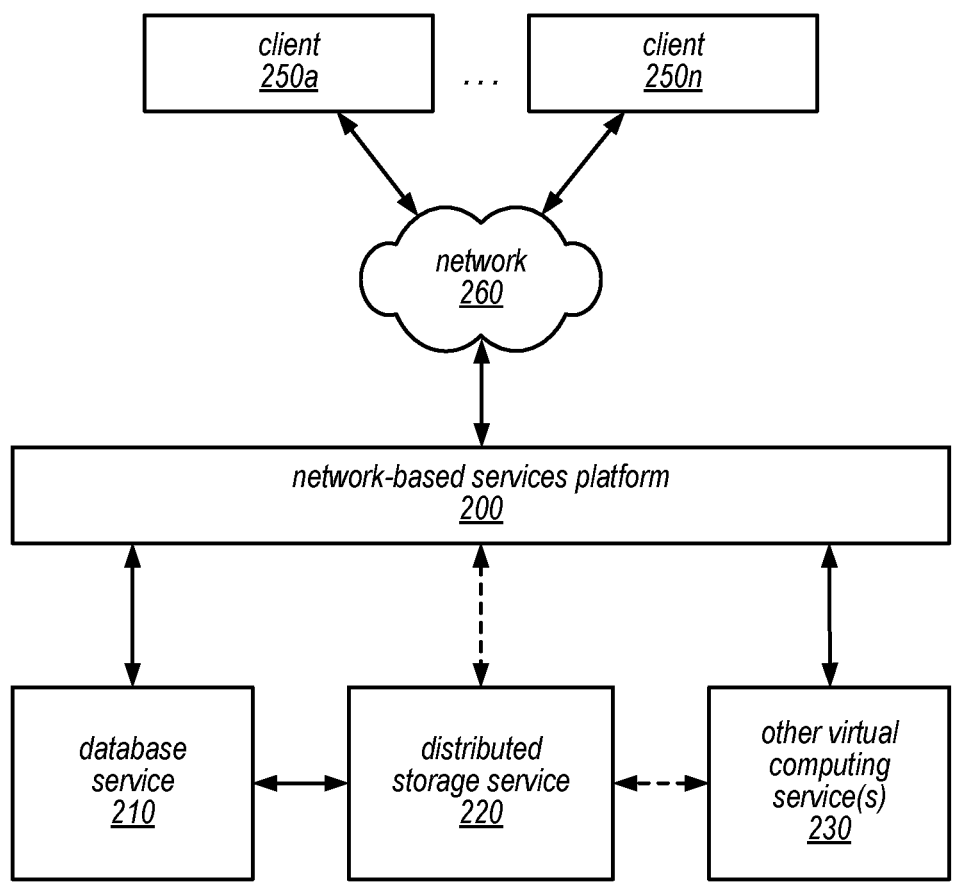
FIG. 2 is a block diagram illustrating a service system architecture that may be configured to implement a network-based database service and a network-based distributed storage service that may provide access to spatial data, according to some embodiments.

FIG. 2 is a block diagram illustrating a service system architecture that may be configured to implement a network-based database service and a network-based distributed storage service that may provide access to spatial data, according to some embodiments. In the illustrated embodiment, a number of clients (shown as clients 250*a*-250*n*) may be configured to interact with a network-based services platform 200 via a network 260. Network-based services platform 200 may be configured to interface with one or more instances of a database service 210, a distributed storage service 220 and/or one or more other virtual computing services 230. Distributed storage service may be implemented as log-structured storage using a single log sequence number space. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a to manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore a snapshot, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Although not illustrated, in various embodiments distributed storage service 220 may be configured to interface with backup data store, system, service, or device. Various data, such as data pages, log records, and/or any other data maintained by distributed storage service internal clients, such as database service 210 or other virtual computing services 230, and/or external clients such as clients 250a through 250n, may be sent to a backup data store.

Note that in various embodiments, different storage policies may be implemented by database service 210 and/or distributed storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
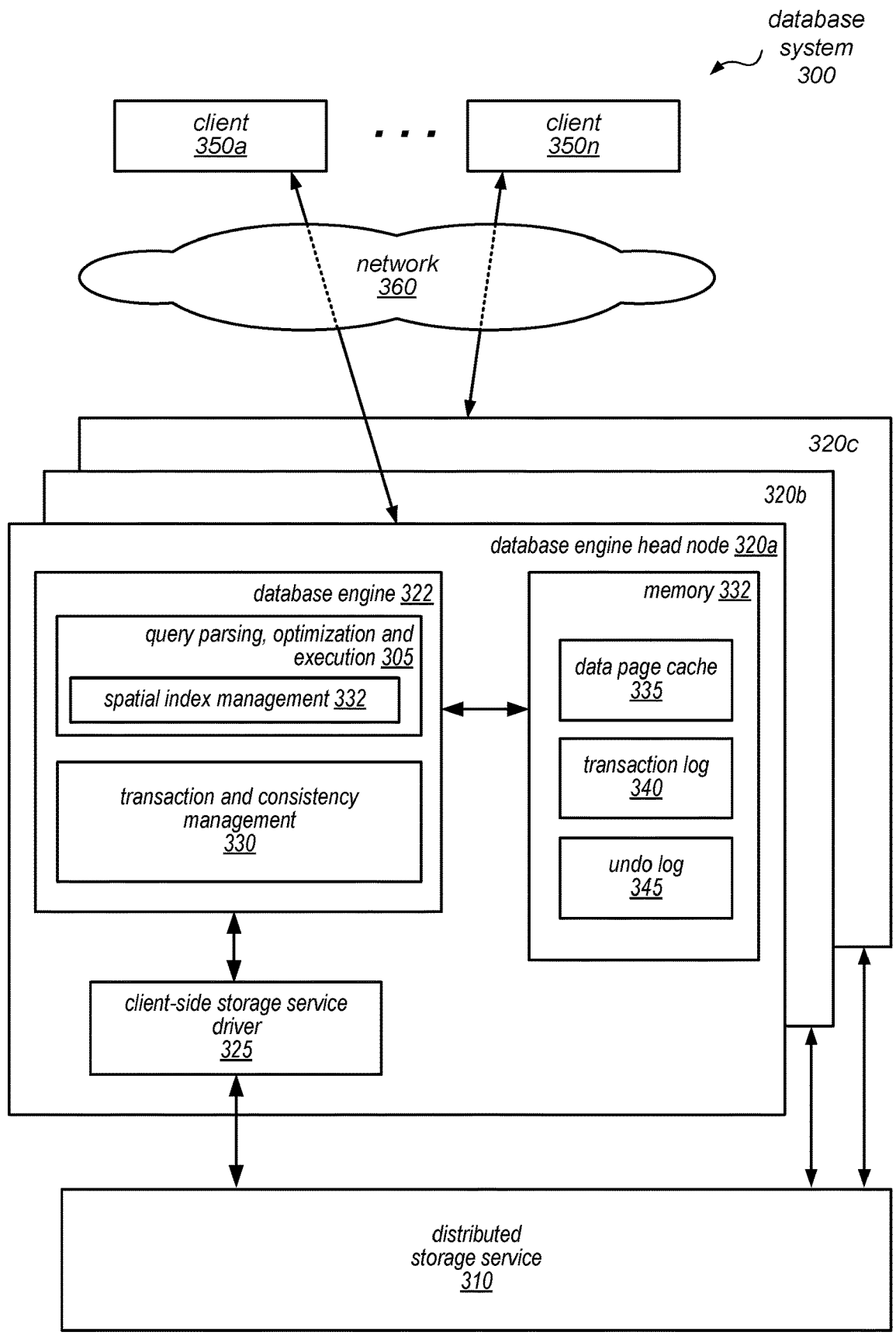
FIG. 3 is a block diagram illustrating various components of a database system that includes a database engine that implements selective maintenance of a spatial index for spatial data maintained in a separate distributed storage service, according to some embodiments.

FIG. 3 is a block diagram illustrating various components of a database system that includes a database engine that implements selective maintenance of a spatial index for spatial data maintained in a separate distributed storage service, according to some embodiments. In this example, database system 300 includes a respective database engine head node 320 for each of several databases and a distributed storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed storage service 310, which may be employed by the database system to store a database volume (such as data pages of one or more databases, as well as redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350*a*, which may include write acknowledgements, requested data pages (or portions thereof), error messages, and or other responses, as appropriate.

Figure 4:
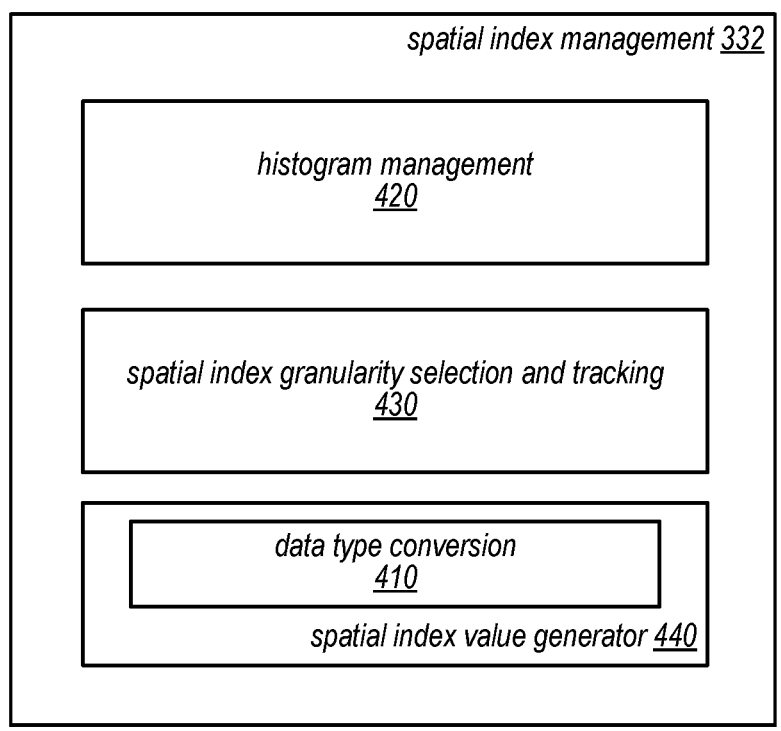
FIG. 4 is a block diagram illustrating an example spatial index manager that may be implemented as part of a database engine or other storage engine, according to some embodiments.

In some embodiments, query parsing, optimization, and execution component 305 may implement spatial index management 332 to selectively maintain a spatial index for spatial data stored as part of the database service. FIG. 4 is a block diagram illustrating an example spatial index manager that may be implemented as part of a database engine or other storage engine, according to some embodiments. Note that various other types of database engines or storage engines may implement similar features as those discussed below with regard to FIG. 4, and thus implementation of spatial index management 332 within query parsing the database service is not intended to be limiting.

Spatial index management 332 may implement spatial index value generator 440 to generate the spatial index values for a spatial object according to the indexing schema for the spatial index. If, for instance, an X-Z ordering is implemented, as discussed above with regard to FIG. 1, then spatial index value generator may determine a Z-order value for a spatial data object based on the quadrant sequence that contains the spatial object. Spatial index value generator 440 may account for distortion in spatial object representation, in some embodiments. For example, spatial index value generator may implement data representation modification 410 as part of generating spatial index values. Consider a spatial object submitted as a coordinate in double precision floating point format (IEEE-754) in accordance with Geographic Information System (GIS) standard. The floating point representation used for the spatial object may distort the generation of a spatial index value for the coordinate (e.g., as bit interleaving techniques for space filling curves such as Z-order will be distorted by the way in which a floating point represents the number, as the bits in the mantissa have a different weight depending on the exponent, resulting in poor locality in the spatial curve (which increases the portions of the index that may need to be searched when evaluating the spatial index)). Data object representation modification 410 may identify spatial objects represented in a distorting formation (e.g., in floating point format) and apply different spatial index value generation techniques to correct for the distortion, as discussed below with regard to FIG. 8.

Figure 8:
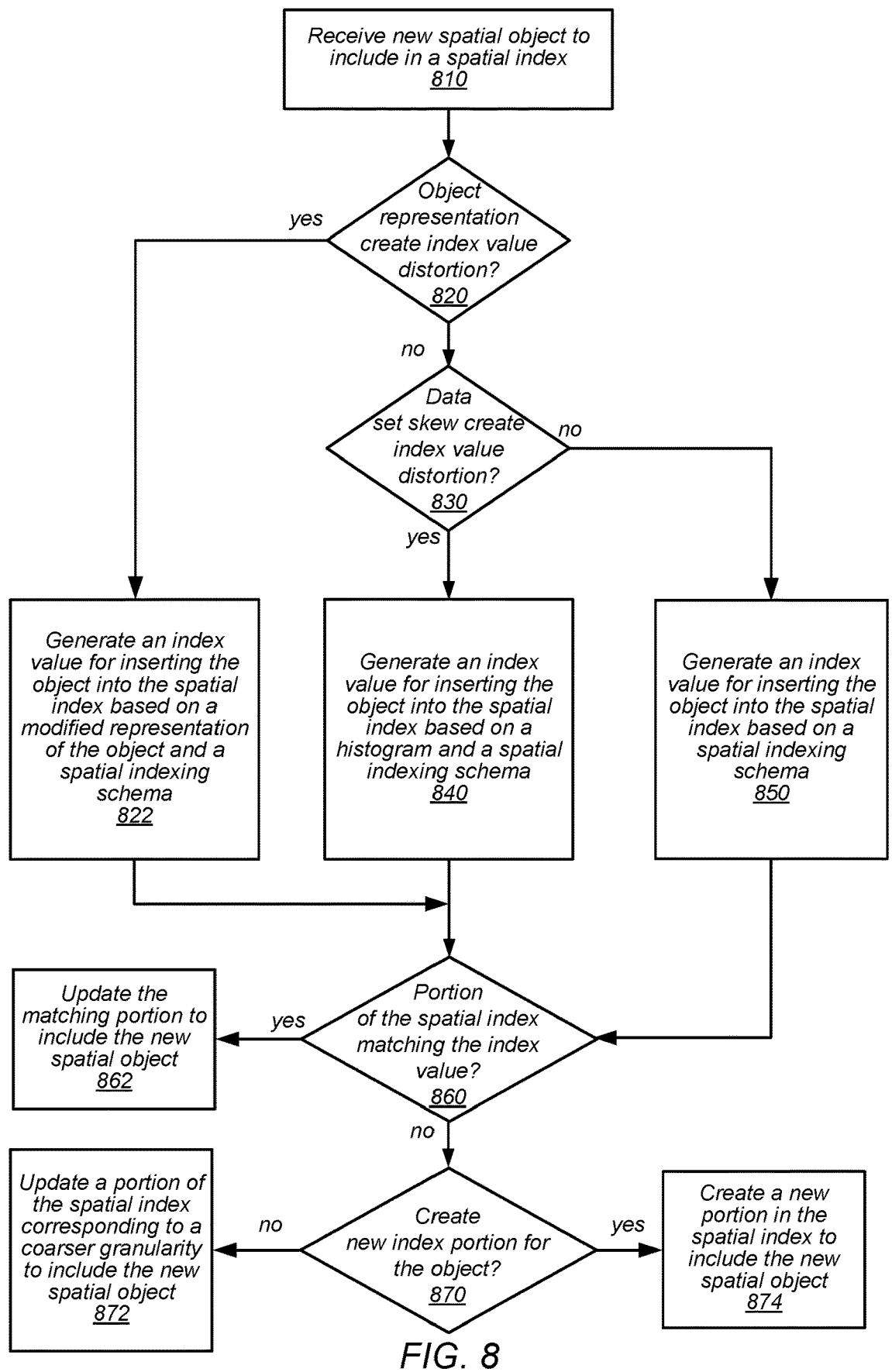
FIG. 8 is a high-level flowchart illustrating techniques for inserting spatial data into a spatial index that is selectively maintained, according to some embodiments.

Spatial index value generator 440 may also account for distortion created as a result of data skew in the spatial data set by applying a histogram to unskew the location of spatial objects in the data set by applying a histogram when generating spatial index values, as discussed below with regard to FIG. 8. Spatial index management 332 may also implement histogram management 420 to evaluate when a histogram should be generated (e.g., by evaluating samples of spatial data to determine skew and detecting when data skew exceeds some threshold triggering the generation of a histogram) for application by spatial index value generator 420. As discussed below with regard to FIG. 8, in at least some embodiments, a depth-balanced histogram can be generated for a sample of spatial data objects to determine the spatial index value for new spatial data objects for insertion into the spatial index. Histogram management 420 may maintain prior histograms previously used to insert spatial objects into the spatial index so that upon evaluating the spatial index for a spatial query, the prior histograms may be used to check whether a spatial object is located in the spatial index according to a spatial index value determined by a prior histogram or a current histogram.

Spatial index management 332 may also implement spatial index granularity selection and tracking 430 to identify what regions have corresponding portions in a spatial index. For example, spatial index granularity selection and tracking 430 may maintain a list of quadrant sequences that have corresponding portions in the spatial index. Spatial index granularity selection and tracking 430 may also determine when to create new portions for the index, as discussed below with regard to FIG. 8.

Database engine head node 320*a* may also include a data page cache 335, in which data pages that were recently accessed may be temporarily held. As illustrated in FIG. 3, database engine head node 320*a* may also include a transaction and consistency management component 330, which may be responsible for providing transactionality and consistency in the database instance of which database engine head node 320*a* is a component. For example, this component may be responsible for ensuring the Atomicity, Consistency, and Isolation properties of the database instance and the transactions that are directed that the database instance. As illustrated in FIG. 3, database engine head node 320*a* may also include a transaction log 340 and an undo log 345, which may be employed by transaction and consistency management component 330 to track the status of various transactions and roll back any locally cached results of transactions that do not commit.

Database engine head node 320*a* may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350*a*). Client-side storage device may maintain mapping information about the database volume stored in distributed storage service 310, such that a particular protection group maintaining a partition of the database volume may be determined. Read requests and redo log records may then be routed to storage nodes that are members of the protection group according to the partition of user data to which the read request is directed or to which the redo log record pertains.

Note that each of the other database engine head nodes 320 illustrated in FIG. 3 (e.g., 320*b* and 320*c*) may include similar components and may perform similar functions for queries received by one or more of database clients 350*a*-350*n* and directed to the respective database instances of which it is a component.

In some embodiments, the distributed storage systems described herein may organize data in various logical data volumes, extents (which may include partitions of the user data space in the volume and a segmentation of the log for the volume) made durable among a protection group of storage nodes, segments (which may be data stored on an individual storage node of a protection group) and pages for storage on one or more storage nodes. For example, in some embodiments, each database is represented by a logical volume, and each logical volume is partitioned over a collection of storage nodes into extents. A protection group may be composed of different storage nodes in the distributed storage service that together make an extent durable. Multiple segments, each of which lives on a particular one of the storage nodes in a protection group, are used to make the extent durable.

In some embodiments, each data page is stored in a segment, such that each segment stores a collection of one or more data pages and a change log (also referred to as a redo log) (e.g., a log of redo log records) for each data page that it stores. Thus, change logs may be log records segmented to the protection group of which the segment is a member. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

Figure 5:
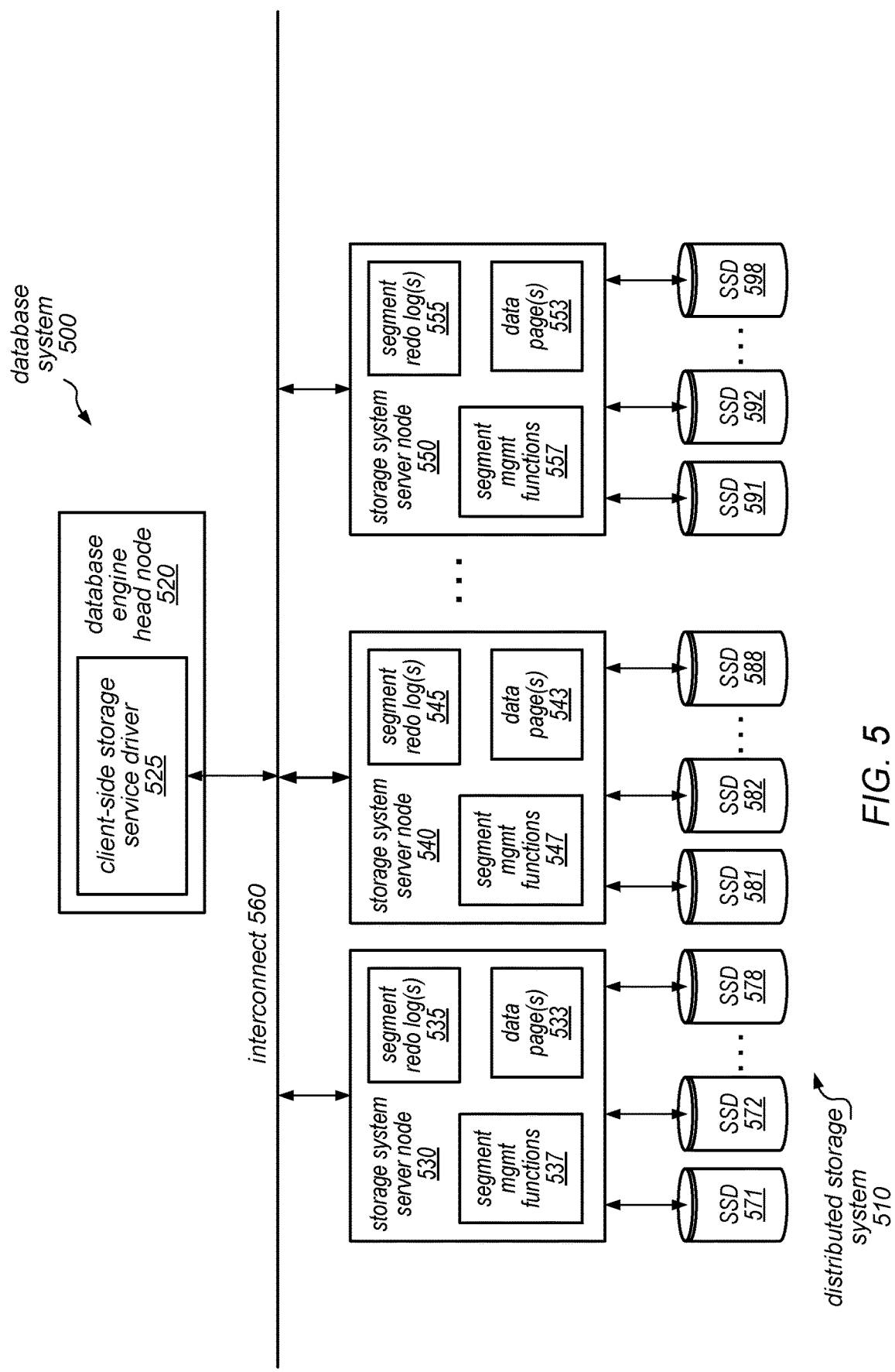
FIG. 5 is a block diagram illustrating a distributed storage system, according to some embodiments.

As used herein, the following terms may be used to describe the organization of data by a distributed storage system as illustrated and described by FIG. 5, according to various embodiments. However, in other embodiments, such as data stores that do not implement log-structured storage, such terms may be differently defined. Thus the following discussion of terms is provided to include different examples and is not intended to be limiting as to other definitions known to those of ordinary skill in the art.

Volume: A volume may be a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)) assigned from a log sequence number space. Each ULR may be persisted to one or more synchronous segments in the log-structured distributed store that form a Protection Group (PG) maintaining the partition of user data space (i.e. extent) to which the update indicate by the log record pertains in order to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment may be a limited-durability unit of storage assigned to a single storage node. Multiple segments may be implemented in a protection group to persist an extent. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page may be a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page may be a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Log records may include metadata, such as pointers or back links, that indicate a previous LSN for log record maintained at a particular segment and/or the previous LSN in the log sequence number space. Control Log Records (CLRs), which are generated by the storage system, may also contain control information used to keep track of metadata such as the current unconditional volume durable LSN (VDL). Null Log Records (NLRB) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record may be the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages may be the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware. Some user pages may be index data pages which may be dynamically split or merged as discussed above.

Data page: A data page may be a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node may be a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance. Multiple storage nodes may together implement a protection group, in some embodiments.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

One embodiment of a distributed storage system is illustrated by the block diagram in FIG. 5. In at least some embodiments, storage nodes 530-550 may store data for different clients as part of a multi-tenant storage service. In some embodiments, a database system 500 may be a client of distributed storage system 510, which communicates with a database engine head node 520 over interconnect 560. As in the example illustrated in FIG. 3, database engine head node 520 may include a client-side storage service driver 525. In this example, distributed storage system 510 includes multiple storage system server nodes (including those shown as 530, 540, and 550), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery (e.g., determining candidate log records for volume recovery), and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 5, storage system server node 530 includes data page(s) 533, segment redo log(s) 535, segment management functions 537, and attached SSDs 571-478. Again note that the label "SSD" may or may not refer to a solid-state drive, but may more generally refer to a local block storage volume, regardless of its underlying hardware. Similarly, storage system server node 540 includes data page(s) 543, segment redo log(s) 545, segment management functions 547, and attached SSDs 581-488; and storage system server node 550 includes data page(s) 553, segment redo log(s) 555, segment management functions 557, and attached SSDs 591-498.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Figure 6:
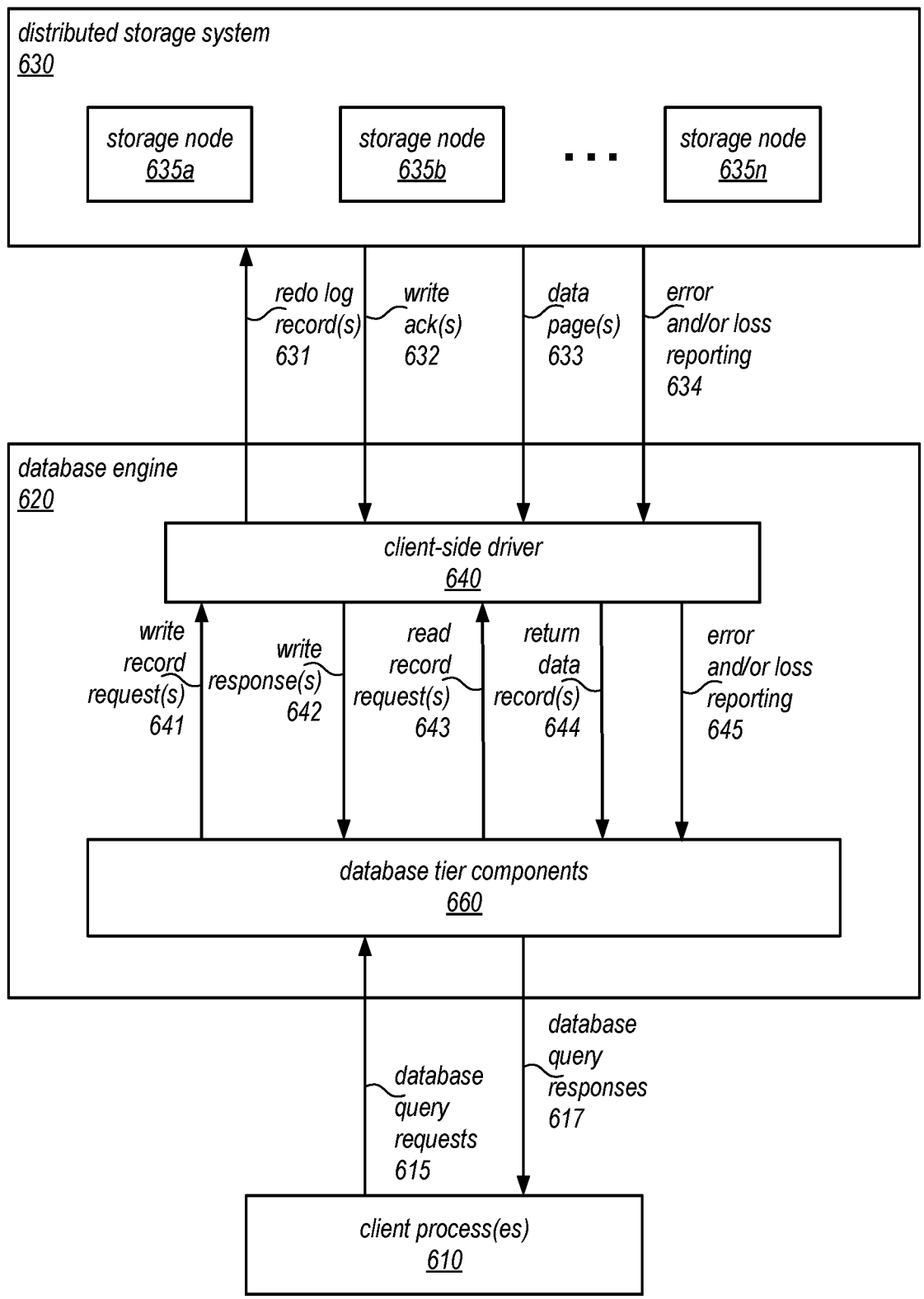
FIG. 6 is a block diagram illustrating the use of a separate distributed storage system in a database system, according to some embodiments.

FIG. 6 is a block diagram illustrating the use of a separate distributed storage system in a database system, according to one embodiment. In this example, one or more client processes 610 may store data to one or more databases maintained by a database system that includes a database engine 620 and a distributed storage system 630. In the example illustrated in FIG. 6, database engine 620 includes database tier components 660 and client-side driver 640 (which serves as the interface between distributed storage system 630 and database tier components 660). In some embodiments, database tier components 660 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3). In various embodiments, database engine 620 may have obtained a volume epoch indicator or other identifier from distributed storage system 630 granting access writes to a particular data volume, such as by sending a request to open the data volume to distributed storage system 630.

In this example, one or more client processes 610 may send database query requests 615 (which may include read and/or write requests targeting data stored on one or more of the storage nodes 635a-635n) to database tier components 660, and may receive database query responses 617 from database tier components 660 (e.g., responses that include write acknowledgements and/or requested data). Each database query request 615 that includes a request to write to a data page may be parsed and optimized to generate one or more write record requests 641, which may be sent to client-side driver 640 for subsequent routing to distributed storage system 630. In this example, client-side driver 640 may generate one or more redo log records 631 corresponding to each write record request 641, and may send them to specific ones of the storage nodes 635 of specific protection groups storing the partition user data of user data space to which the write record request pertains in distributed storage system 630. Client-side driver 640 may generate metadata for each of the redo log records that includes an indication of a previous log sequence number of a log record maintained at the specific protection group. Distributed storage system 630 may return a corresponding write acknowledgement(s) 623 for each redo log record 631 to database engine 620 (specifically to client-side driver 640). Client-side driver 640 may pass these write acknowledgements to database tier components 660 (as write responses 642), which may then send corresponding responses (e.g., write acknowledgements) to one or more client processes 610 as one of database query responses 617.

In this example, each database query request 615 that includes a request to read a data page may be parsed and optimized to generate one or more read record requests 643, which may be sent to client-side driver 640 for subsequent routing to distributed storage system 630. In this example, client-side driver 640 may send these requests to specific ones of the storage nodes 635 of distributed storage system 630, and distributed storage system 630 may return the requested data pages 633 to database engine 620 (specifically to client-side driver 640). Client-side driver 640 may send the returned data pages to the database tier components 660 as return data records 644, and database tier components 660 may then send the data pages to one or more client processes 610 as database query responses 617.

In some embodiments, various error and/or data loss messages 634 may be sent from distributed storage system 630 to database engine 620 (specifically to client-side driver 640). These messages may be passed from client-side driver 640 to database tier components 660 as error and/or loss reporting messages 645, and then to one or more client processes 610 along with (or instead of) a database query response 617.

In some embodiments, the APIs 631-534 of distributed storage system 630 and the APIs 641-545 of client-side driver 640 may expose the functionality of the distributed storage system 630 to database engine 620 as if database engine 620 were a client of distributed storage system 630. For example, database engine 620 (through client-side driver 640) may write redo log records or request data pages through these APIs to perform (or facilitate the performance of) various operations of the database system implemented by the combination of database engine 620 and distributed storage system 630 (e.g., storage, access, change logging, recovery, and/or space management operations). As illustrated in FIG. 6, distributed storage system 630 may store data blocks on storage nodes 635a-635n, each of which may have multiple attached SSDs. In some embodiments, distributed storage system 630 may provide high durability for stored data block through the application of various types of redundancy schemes.

As noted above, in some embodiments, the functional components of a database system may be partitioned between those that are performed by the database engine and those that are performed in a separate, distributed storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

Figure 7:
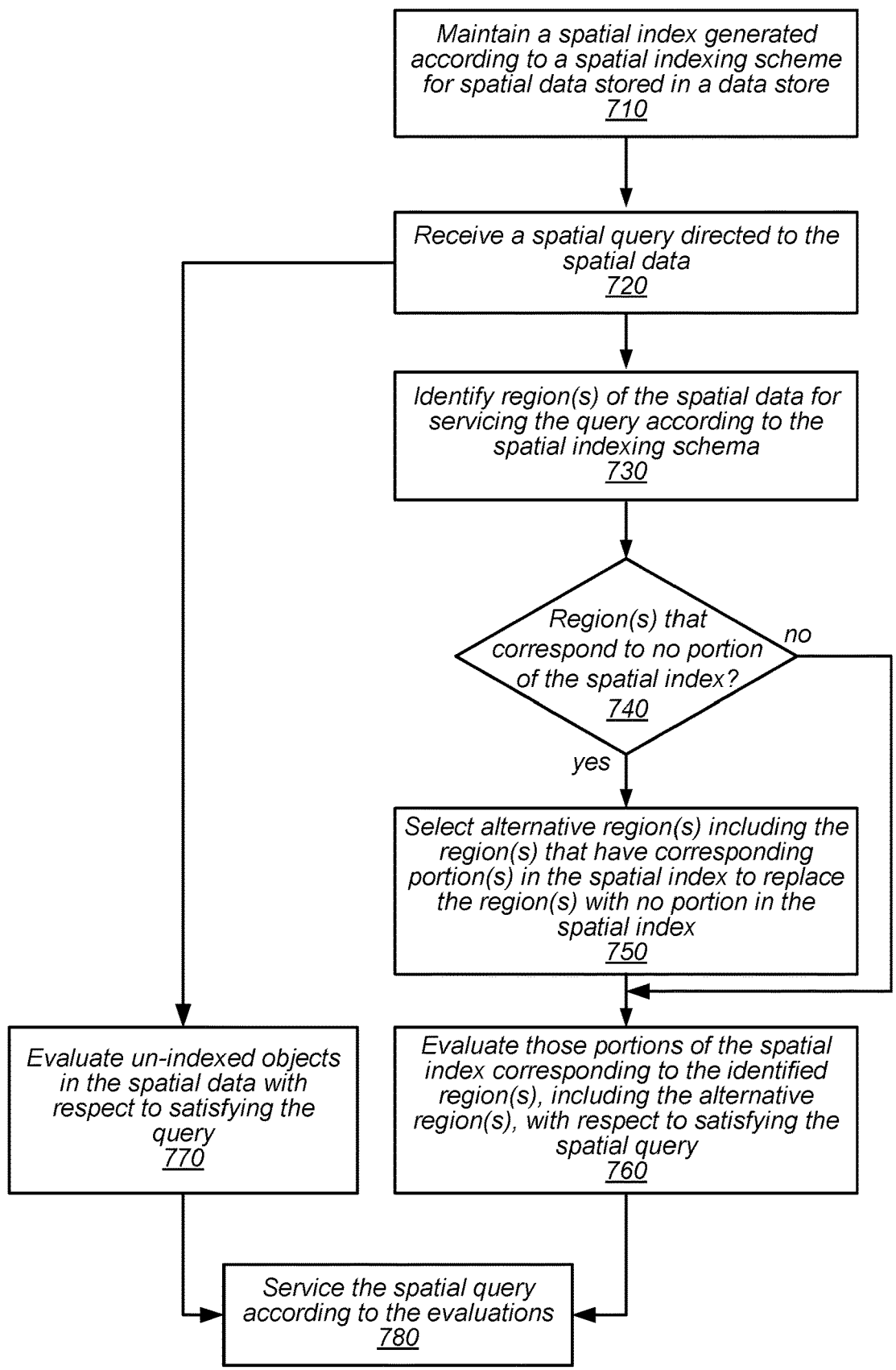
FIG. 7 is a high-level flowchart illustrating techniques to evaluate a spatial index that is selectively maintained in order to process queries directed to spatial data, according to some embodiments.

The database service and distributed storage service discussed in FIGS. 2 through 6 provide examples of a system that may selectively maintain a spatial index for spatial data. However, various other types of data stores (e.g., database systems that do not utilize a separate storage system) or other storage engines may implement selective maintenance of a spatial index. FIG. 7 is a high-level flowchart illustrating techniques to evaluate a spatial index that is selectively maintained in order to process queries directed to spatial data, according to some embodiments.

As indicated at 710, a spatial index generated according to a spatial indexing scheme for spatial data stored in a data store may be maintained, in various embodiments. A spatial index, as discussed above with regard to FIG. 1, may identify locations or regions that include spatial objects. Some spatial indexes may maintain multiple locations for a spatial object (e.g., when the spatial object cross multiple region boundaries, identifying each region that includes a portion of the spatial object), whereas other spatial indexes, such as those indexes implementing X-Z ordering as discussed above with regard to FIG. 1, may not duplicate objects in different spatial index locations. Various indexing schemes may be utilized to implement a spatial index. For example, in various embodiments, space filling curves, such as the Hilbert curve, Gray-Codes curve, U-Index curve, Peano curve, Z-mirror curves, or Morton-order (Z-order) curve, may be used to generate spatial index values for spatial objects so that the spatial objects may be ordered along the curve, and thus organized according to the spatial index values in the indexing structure implementing the spatial index. Different indexing structures may be utilized to implement the spatial index, including various forms of a balanced tree (e.g., B+tree), and may be an order-preserving, one-dimensional indexing structure.

As indicated at 720, a spatial query directed to the spatial data may be received. The spatial query may include a predicate that specifies an unbound and bound variable that are related by different operators. For example, an "overlaps" operator may be implemented to request data where the unbound variable (e.g., a geographic area) overlaps the bound variable (e.g., a figure). Other operators may include operations to determine whether the unbound variable "contains" the bound variable and operations to determine whether the unbound variable is "contained by" the bound variable.

As indicated at 730, a determination may be made as to region(s) of the spatial data for servicing the query according to the spatial indexing schema. For example, the unbound variable may identify a geographic area (e.g., a query window) in which to determine whether the bound variable satisfies the operator (e.g., overlaps, contains, contained by). The regions of the spatial data may be determined according to the ways in which regions are represented by the spatial indexing schema. For example, the quadrant scheme discussed above with regard to FIG. 1, may identify the regions based on whether the geographic area intersects a quadrant. If a quadrant is completely enclosed by the geographic area, then the quadrant is identified as a region for servicing the query. If a quadrant is not completely enclosed by the geographic area, then sub-quadrants of the quadrant may be recursively evaluated until all the quadrants that are completely enclosed within the geographic area are identified as regions for servicing the query. For those quadrants that do not intersect the geographic area, then those quadrants are not identified as a region for servicing the query. The various identified regions may be specified according to the quadrant sequence (e.g., quadrant 1, quadrant 10, quadrant 103, etc.) in some embodiments.

As indicated at 740, region(s) that correspond to no portion of the spatial index, may be identified, in some embodiments. For example, spatial index metadata may indicate which quadrant sequences are maintained, and which are not. A comparison of the corresponding quadrant sequences that are maintained with the quadrant sequences corresponding to the identified regions may indicate whether corresponding portions exist for the identified region(s) in the spatial index. As indicated at 750, for those region(s) without corresponding portions in the spatial index, an alternative region may be selected that includes the region with no corresponding portion in the index. The alternative region may include the region that it is selected to replace (e.g., the quadrant from which the region was subdivided). In this way, the spatial index may be selectively managed to maintain portions for different regions when optimal and combine regions into a single inclusive portion of the index when optimal. Time may not be wasted attempting locate portions of the spatial index that do not exist.

As indicated at 760, those portions of the spatial index corresponding to the identified regions, including the alternative region(s), may be evaluated with respect to satisfying the query. Either information maintained in the portions themselves (an index within the portion) may be used to determine whether to access certain spatial data or all of the spatial data identified by the portion(s) of the spatial index may be accessed to determine if the accessed spatial data satisfies the spatial query. The spatial query may then be serviced according to the evaluation, as indicated at 780. For example, the identified spatial objects that satisfy the spatial query may be returned or a null result may be returned.

In some embodiments, a collection of un-index objects may be separately maintained that are evaluated in addition to the spatial index, as indicated at 770. For example, spatial objects with extremely large boundaries (e.g., a line or plane of infinite length), may be represented or stored as part of a collection (e.g., in a spatial data structure, such as an array or list) that may allow the set of un-index objects to be scanned to determine whether any of the un-indexed objects satisfy the spatial query. Accordingly, the spatial query may then be serviced according to the evaluation, as indicated at 780. As above, the identified spatial objects that satisfy the spatial query may be returned or a null result may be returned.

Selective maintenance of a spatial index directs updates to the spatial index in different ways. Instead of creating new portions of the spatial index to maintain a portion corresponding to each region at different granularity levels, for instance, new portions may be instead subsumed within another portion of the index representing a region that includes the potential new portion. In this way, separate probes or searches for individual regions within the spatial index may be reduced, improving the performance and efficiency of servicing queries using the spatial index, as noted above. FIG. 8 is a high-level flowchart illustrating techniques for inserting spatial data into a spatial index that is selectively maintained, according to some embodiments.

As indicated at 810 a new spatial object may be received for insertion into a spatial index. For example, a SQL insert request may insert a new row into a relational database table or an Update request may add a new data object to a non-relational database table. Such requests may include a spatial data object (e.g., a point, line, polygon or other shape or figure as defined by one or more coordinates in n-dimensional space). However formatted, once the new spatial object is inserted into the underlying storage, an update to include in a spatial index. Therefore, the appropriate portion of the indexing structure for the spatial index may be identified according to the indexing schema for representing spatial data in the spatial index. As discussed above with regard to FIG. 7, different indexing schemas may be implemented to create a spatial index. For example, various space filling curves (e.g., Hilbert curve, Gray-Codes curve, U-Index curve, Peano curve, Z-mirror curves, or Morton-order (Z-order) curve) or various forms of such curves (e.g., the X-Z ordering curve that extends Z-order) may be used to generate spatial index values which map spatial data into regions that may be identified when querying the spatial index.

In some embodiments, some representations or forms of the data describing the new spatial object may be less optimal or inefficient for generating an index value according to an indexing scheme. For example, floating point representations of coordinate sets may describe the new spatial object (e.g., coordinates formatted according to Geographic Information System (GIS) format). However, such floating point representations may not generate optimal spatial index values (e.g., according to a space filling curve, such as Z-order), as a given bit position in the mantissa of the floating point representation may have a different magnitude depending on the exponent which would create unrepresentative spatial index values (e.g., by interleaving bits from the a set of coordinates). Therefore, a determination may be made as to whether the current representation of the object creates spatial index value distortion (e.g., whether the spatial object is represented by a floating point coordinate). If so, as indicated by the positive exit from 820, then the spatial index value that is generated for the spatial object may be generated based on a modified representation of the object and the indexing schema, as indicated at 822. For example, consider a pair of floating point coordinates, with each dimension represented in 64 bits. An integer, spatial index value for the pair of coordinates may be determined that is 128 bits (2 dimensions multiplied by the number of representational bits) according to a space filling curve that applies a total order on floating point coordinates in two dimensions. To apply the space filling curve, the 128-bit address space for the spatial index may be divided into 4 quadrants (e.g., (i) X<0, Y<0, (ii) X<0, Y>0, (iii) X>0, Y<0, (iv) X>0, Y>0) with assigned quadrant values of 0, 1, 2, and 3 respectively. Furthermore, each quadrant may be divided into segments, such that for any two points P1, P2 in the segment, the exponent for the X coordinate of P1 equals the exponent for the X coordinate of P2 and the exponent for the Y coordinate of P1 equals the exponent for the Y coordinate of P2. Because a total order can be determined for floating point coordinates by comparing the dimension with the most significant bit, segments may be determined with the understanding that the points within a segment can be numbered contiguously without violating the total order of points located in different segments. The size of each segment may be $2^{\wedge}(\text{MANTISSA\_BITS}*2)$. A numeric value may be assigned to each segment according to the total order (e.g., 01, 02, 03, 04, etc.). An offset value within a segment may also be calculated. Thus, when a spatial object represented by floating point coordinates is received, the quadrant, segment, and offset of the coordinates within the segment may be determined. The combined quadrant, segment, and offset values may be then be used as the spatial index value.

Data skew may occur in spatial data for a variety of reasons. For example, if spatial data objects are specified with an X coordinate in meters and the Y coordinate in kilometers, using the raw numbers in these units would create an unselective representation of the coordinate in the spatial index, leading to poor performance when evaluating the spatial index. Instead of using the raw units, sampling or other skew analysis of the spatial data can be performed to determine a different way to generate the spatial index values that better distributes the spatial data along a space filling curve. In at least some embodiments, a depth-balanced histogram can be generated for a sample of spatial data objects to determine the spatial index value for spatial data objects. Therefore, as indicated by the positive exit from 830, it may be determined for the new spatial object, that a histogram be applied to the insertion of the new spatial object into the index.

As indicated at 840, a spatial index value for inserting the new spatial object into the spatial index may be generated based on the histogram and the spatial indexing scheme. For example, one dimension of coordinate values (e.g., y values) may be mapped to a different assigned value by the bucket (e.g., range of y values) into which the dimension is mapped in the histogram. For example, buckets may be defined as ranges of y values (e.g., bucket A 1<y<=100, bucket B 100<y<=150, bucket C 150<y<=190, etc.) and mapped to assigned values (e.g., bucket A=100, bucket B=200, bucket C=300, etc.). When the histogram is applied, the bucket value for a y dimension coordinate may be used in place of the raw value for purposes of generating the spatial index value according to the spatial indexing schema. For example, if a Z-ordering curve is utilized to implement the spatial index, then bits of the binary forms of a coordinate (X=110, Y=175) may be interleaved using the assigned value for the bucket that includes the Y value, 300, so that 110 and 300 are interleaved.

When updating the index to include the new spatial object, a prefix or field indicating the histogram applied to the new spatial object may also be included so that the spatial index value includes the indicator of the applied histogram. Because data skew may change over time, new histograms may be generated (e.g., based on different samples of spatial data) and thus different indicator values may be included in the spatial index values generated using the different histograms. Thus, the spatial index values of the same spatial object would differ if inserted using a different histogram because either the bucket into which the spatial object is placed when generating the histogram value changes and/or the indicator value for the histogram changes. In this way, spatial data objects located in the spatial index using different histograms may be maintained and mixed in the same indexing structure without having to rebuild or recreate the spatial index to utilize a different histogram. Instead, different evaluations of the spatial index may be made according to the different histograms when processing a spatial query, as discussed above.

As indicated at 850, if no histogram is applied, then the spatial index value may be generated based on the spatial indexing schema (without a histogram, using the raw or converted values). For example, a bit interleaving technique may be implemented to generate Z-order value if a single point, or an X-Z order value may be generated for a non-zero spatial object (e.g., a rectangle). If the spatial index value, generated at 850 or 852, matches a portion of the spatial index, then as indicated by the negative exit from 862, the matching portion of the spatial index may be updated to include the spatial object. For example, a matching portion may be a portion of the spatial index that includes a leaf node with a spatial index value that matches the spatial index value determined for the new spatial object.

However, as indicated by the negative exit from 860, if no portion of the spatial index matches the spatial index value, then a determination may be made as to whether to create a new index portion for the new spatial object that matches in the index value, as indicated at 870. For example, a limit or threshold on the number of index portions (e.g., new leaf nodes) may be enforced (unless storage space limitations in a data page maintaining the leaf node requires a page split). If the new portion would exceed the threshold, then a new portion of the spatial index may not be created. In some embodiments, cost models may be implemented to determine whether or not to create a new portion of a spatial index. For example, more spatial index portions may result in more evaluations to be performed to service a spatial query. However, the greater the number of spatial objects located in an index portion, the less selective the spatial index becomes. A cost model may determine a cost resulting from placing the spatial object in a new portion. If the cost exceeds a cost threshold, then the new index portion may not be created. Note that various kinds of performance statistics for the spatial index may be tracked, including the number of times an individual portion is accessed. Other heuristics besides cost modeling may be implemented and thus the previous example is not intended to be limiting.

If, as indicated by the negative exit from 870 a new portion of the spatial index is not to be created, then the spatial index may be updated at a portion that corresponds to a coarser region to include the new spatial object (e.g., by inserting a pointer to the new spatial object as a child leaf node of the node representing the coarser region). If, however, as indicated by the positive exit from 870 a new portion of the spatial index is to be created, then as indicated at 874, a new portion in the spatial index may be created to include the new spatial object. For example, various operations may be performed to insert a new leaf node that identifies objects with the same spatial index value, including the new spatial data object.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 9:
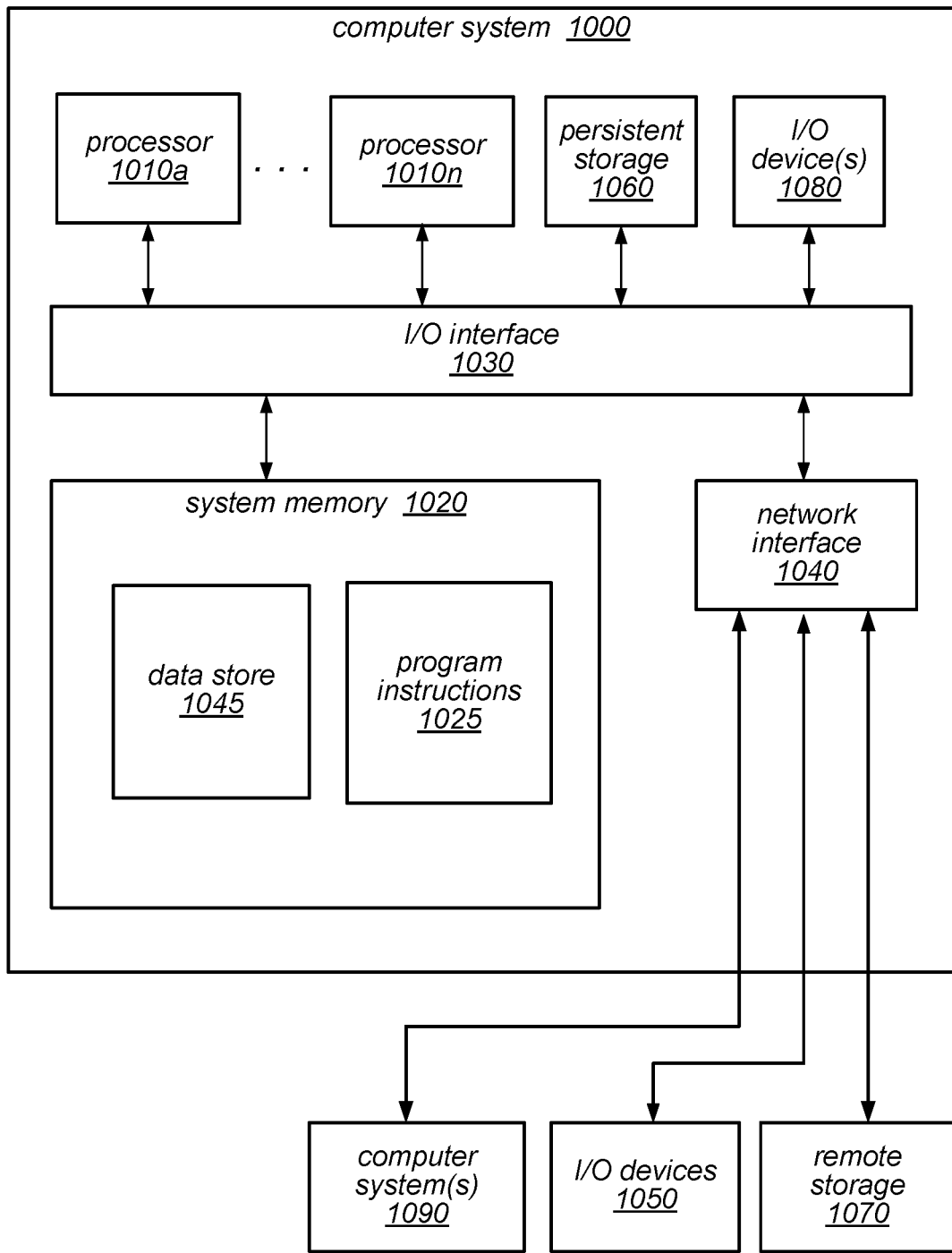
FIG. 9 is an example computer system, according to various embodiments.

FIG. 9 is a block diagram illustrating a computer system configured to implement selectively maintenance of a spatial index for spatial data, as well as various other systems, components, services or devices described above. For example, computer system 1000 may be configured to implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a to uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   one or more storage devices, that store data for a database, wherein the data comprises spatial data;
   at least one processor; and
   a memory, storing program instructions that when executed by the at least one processor cause the at least one processor to implement a database;
   the database engine, configured to:
      maintain a spatial index generated according to a spatial indexing schema for the spatial data, wherein different portions of the spatial index are associated with respective spatial area regions that include corresponding spatial data regions of the spatial data;
      receive a spatial query directed to the spatial data;
      identify one or more spatial data regions of the spatial data for servicing the query according to the spatial indexing schema;
      access metadata for the spatial index to determine that a portion corresponding to a one of the identified spatial data regions does not exist in the spatial index; and
      based, at least in part, on the metadata for the spatial index, select an alternative spatial area region that corresponds to an existing portion of the spatial index and that includes the identified spatial data region to substitute for the portion of the spatial index that does not exist;
      evaluate those portions of the spatial index corresponding to the identified one or more spatial data regions, including the existing portion, with respect to satisfying the spatial query; and
      based, at least in part, on the evaluation of the spatial index, access the one or more identified regions of the spatial data in the storage devices to service the spatial query.

2. The system of claim 1, wherein the database engine is further configured to:
   receive a new spatial object to store as part of the spatial data in the database;
   generate a spatial index value for inserting the new spatial object into the spatial index;
   determine that the spatial index value does not match one of the portions of the spatial index; and
   modify the spatial index value to match another one of the portions of the spatial index, wherein the other portion corresponds to a region that includes the new spatial object; and
   insert the new spatial object into the spatial index according to the modified spatial index value.

3. The system of claim 1, wherein the database engine is further configured to:
   based on at least some of the spatial data, generate a histogram for the spatial data;
   receive a new spatial object to store as part of the spatial data in the database;
   generate a spatial index value for inserting the new spatial object into the spatial index based, at least in part on the histogram; and
   insert the new spatial object into the spatial index according to the spatial index value.

4. The system of claim 1, wherein the database engine is a database engine node implemented as part of a network-based database service that stores the database on behalf of a client of the database service and wherein the one or more storage devices are implemented as part of separate storage services in a same network-based services platform as the database service.

5. A method, comprising:
   performing, by one or more computing devices:
      maintaining a spatial index generated according to a spatial indexing schema for spatial data stored in a data store, wherein different portions of the spatial index are associated with respective spatial area regions that include corresponding spatial data regions of the spatial data;
      receiving a spatial query directed to the spatial data;
      identifying one or more spatial data regions of the spatial data for servicing the query according to the spatial indexing schema;
      accessing metadata for the spatial index to determine that a portion corresponding to one of the identified spatial data regions does not exist in the spatial index; and selecting an alternative spatial area region that corresponds to an existing portion of the spatial index and that includes the identified spatial data region to substitute for the portion of the spatial index that does not exist;

evaluating those portions of the spatial index corresponding to the identified one or more spatial data regions, including the existing portion, with respect to satisfying the spatial query; and servicing the spatial query according to the evaluation of the those portions of the spatial index corresponding to the identified one or more regions.

6. The method of claim 5, further comprising:

based on at least some of the spatial data, generating a histogram for the spatial data;

receiving a new spatial object to store as part of the spatial data in the data store;

generating a spatial index value for inserting the new spatial object into the spatial index based, at least in part on the histogram; and inserting the new spatial object into the spatial index according to the spatial index value.

7. The method of claim 6, wherein the method further comprises:

detecting a histogram generation event for the spatial data; and in response to detecting the histogram generation event, generating a different histogram for generating spatial index values.

8. The method of claim 7, further comprising:

receiving a different spatial object to store as part of the spatial data in the data store;

generating a spatial index value for inserting the different spatial object into the spatial index based, at least in part on the different histogram; and inserting the different spatial object into the spatial index according to the spatial index value.

9. The method of claim 5, further comprising evaluating one or more un-indexed spatial objects with respect to satisfying the spatial query, wherein servicing the spatial query is further performed according to the evaluation of the one or more un-indexed spatial objects.

10. The method of claim 5, further comprising:

receiving a new spatial object to store as part of the spatial data;

generating a spatial index value for inserting the new spatial object into the spatial index;

determining that the spatial index value does not match one of the portions of the spatial index; and inserting the new spatial object into another one of the portions of the spatial index, wherein the other portion corresponds to a region that includes the new spatial object.

11. The method of claim 5, further comprising:

receiving a new spatial object to store as part of the spatial data;

generating a spatial index value for inserting the new spatial object into the spatial index;

determining that the spatial index value does not match one of the portions of the spatial index; and inserting the new spatial object into a new portion of the spatial index according to the spatial index value.

12. The method of claim 5, wherein a balanced tree (b tree) data structure implements the spatial index.

13. The method of claim 5, wherein the one or more computing devices are implemented as part of a relational database engine and wherein the spatial data is stored as part of a database table that includes non-spatial data.

14. A non-transitory, computer-readable storage medium, storing program instructions that when executed by one or more computing devices cause the one or more computing devices to implement a storage engine, wherein the storage engine implements:

maintaining a spatial index generated according to a spatial indexing schema for spatial data stored in a data store, wherein different portions of the spatial index are associated with respective spatial area regions that include corresponding spatial data regions of the spatial data;

receiving a spatial query directed to the spatial data;

identifying one or more spatial data regions of the spatial data for servicing the query according to the spatial indexing schema;

accessing metadata for the spatial index to determine that a portion of the spatial index corresponding to one of the identified spatial data regions does not exist in the spatial index; and selecting an alternative spatial area region that corresponds to an existing portion of the spatial index and that includes the identified spatial data region to substitute for the portion of the spatial index that does not exist;

evaluating those portions of the spatial index corresponding to the identified one or more spatial data regions, including the existing portion, with respect to satisfying the spatial query; and based, at least in part, on the evaluating of the spatial index, accessing the spatial data in the data store to service the spatial query.

15. The non-transitory, computer-readable storage medium of claim 14, wherein the program instructions cause the one or more computing devices to further implement:

receiving a new spatial object to store as part of the spatial data;

generating a spatial index value for inserting the new spatial object into the spatial index;

determining that the spatial index value does not match one of the portions of the spatial index; and inserting the new spatial object into another one of the portions of the spatial index, wherein the other portion corresponds to a region that includes the new spatial object.

16. The non-transitory, computer-readable storage medium of claim 15, wherein generating the spatial index value is based, at least in part, on a modified representation of the new spatial object that is different than a received format for the new spatial object.

17. The non-transitory, computer-readable storage medium of claim 14, wherein the program instructions cause the one or more computing devices to further implement:

receiving a new spatial object to store as part of the spatial data;

generating a spatial index value for inserting the new spatial object into the spatial index;

determining that the spatial index value does not match one of the portions of the spatial index; and inserting the new spatial object into a new portion of the spatial index according to the spatial index value.

18. The non-transitory, computer-readable storage medium of claim 15, wherein the program instructions cause the one or more computing devices to further implement:

inserting the new spatial object into the new portion of the spatial index according to the spatial index value in response to determining that creation of the new portion of the index does not exceed a cost threshold.

19. The non-transitory, computer-readable storage medium of claim 14, wherein the program instructions cause the one or more computing devices to further implement evaluating one or more un-indexed spatial objects with respect to satisfying the spatial query, wherein servicing the spatial query is further performed according to the evaluation of the one or more un-indexed spatial objects.

20. The non-transitory, computer-readable storage medium of claim 14, wherein the spatial data is stored as part of a network-based storage service, and wherein the storage engine is configured to access the spatial data via network connection to the network-based storage service.

* * * * *